United States Patent [19]
O'Brien et al.

[11] 3,797,650
[45] Mar. 19, 1974

[54] SHOW-TOTE BALE BAG

[76] Inventors: Julia R. O'Brien; Gary F. O'Brien, both of 626 Union City Rd., Greenville, Ohio 45331

[22] Filed: Feb. 29, 1972

[21] Appl. No.: 230,304

[52] U.S. Cl. ............ 206/83.5, 150/52 R, 190/41 Z
[51] Int. Cl. .......................... A45c 3/00, B65d 71/00
[58] Field of Search ................. 119/1, 52 R, 61, 65; 150/1, 2, 52 R, 52 J; 190/41 Z; 206/83.5

[56] References Cited
UNITED STATES PATENTS

| | | | |
|---|---|---|---|
| 1,953,962 | 4/1934 | Kinney | 190/41 Z |
| 2,279,696 | 4/1942 | St. Thomas | 190/41 Z |
| 2,731,950 | 1/1956 | Davidson | 119/52 R |
| 2,805,430 | 9/1957 | Philbrick | 150/52 R X |
| 2,767,758 | 10/1956 | Haynes | 190/41 Z |

Primary Examiner—Herbert F. Ross
Assistant Examiner—Steven E. Lipman
Attorney, Agent, or Firm—Paul M. Cohen

[57] ABSTRACT

A bale of hay is provided with a weather proof canvas covering. The covering is form fitting and provides access to the enclosed bale of hay from two sides and one end by use of a zipper. Additionally, the covering has some means to facilitate handling of the enclosed bale of hay.

1 Claim, 3 Drawing Figures

SHOW-TOTE BALE BAG

BACKGROUND OF THE INVENTION

1. Field of the Invention

With increasing affluence and the exodus from the cities, there has been a resurgence in the popularity of horses and horseback riding. Horseshows are ever more frequent and popular and attract horse owners from great distances. In general, the horses are transported in trailers towed behind the family automobile or stationwagon. When there is no provision for them in the trailer, the tack required for a horseshow and the horse's feed are frequently carried in or on the stationwagon. During transportation, the bale of hay is bounced around considerably, and a fine dust sifts out of the bale and coats everthing in the stationwagon, much to the discomfort of the occupants. Further, the bale frequently begins to deteriorate resulting in still more discomfort for the passengers in the stationwagon. Additionally, the bare bale is difficult for the hobbiest to handle and frequently results in cuts from the baling straps and wire. Furthermore, after partial use the disintegration of the bale accelerates and makes joint inhabitation of the stationwagon by people and bale virtually impossible. In short, it results in an absolute mess that is a health and safety hazard to the driver and other occupants of the vehicle. (The ventilation system of the vehicle causes the loose straw and dust to fly around causing difficulty in breathing and vision to the occupants.)

It is these problems that the present invention obviates. This is done by providing a form fitting waterproof enclosure having handles and permitting access from primarily one end only.

2. Description of the Prior Art

In the past, there have been numerous attempts to provide protective coverings for bales of material during transportation. However, these protective coverings have been applied for a totally different reason. In each of these instances the covering was provided in order to protect the contents of the bale from weather or to act as a container for the contents. The covering was not provided to prevent disintegration of the bale which results in health and safety hazards for humans, or animals, travelling in the same vehicle as the baled material.

U.S. Pat. No. 701,576 is drawn to a bale covering of this general type. This invention is drawn to a metal container designed primarily for cotton. It is an integral part of the bale being attached to the bale upon formation. Its primary function is to protect the cotton contents of the bale from contamination during travel whereas the primary purpose of the Tote Bale, the instant invention, is to enable one to transport hay or straw in a multipurpose vehicle that may be occupied simultaneously by humans, or animals, and yet permit easy access to the contents of the bale without removing the covering at the point of use.

U.S. Pat. No. 1,452,100 discloses another approach to this problem. Here multi-layered paper is used to package the bale at the point of its formation. The improvement, according to the inventor thereof, consists of the ability to connect the sheets of paper without the necessity of using bale ties or the like. Again, this material, and invention, is of limited applicability in the present situation since no means are provided for manipulating the bale after it has been covered and further, no means are provided to re-close the container after partial use of the bale. It is obviously intended that the covering be totally stripped from the bale at the point of use. These objections are also evident to the invention disclosed in U.S. Pat. Nos. 1,557,881 and 1,874,934, each of which is drawn to a bale covering that is applied at the point of formation of the bale and does not provide for reuse after the contents of the bale have been partially consumed.

OBJECTS AND SUMMARY OF THE INVENTION

It is an object of the invention to provide a covering for a bale of hay that prevents deterioration of the bale and subsequent sifting of hay and other fine airborne particles out of the bale.

It is a further object of the invention to provide a covering for a bale that will enable the contents to be consumed directly from the covering.

It is a still further object of the invention to provide the requisite protective covering for the partially consumed bale which is prone to disintegrate more rapidly.

It is an object of the invention to provide a covering for a bale that is weatherproof and further that facilitates handling of the bale.

It is another obejct of the invention to provide a bale covering so that the contents are protected from the atmosphere and other environmental conditions during transport.

These and other objects and advantages of the instant invention will become apparent from the appended drawings and the following description.

SHORT DESCRIPTION OF THE DRAWINGS

DETAILED DESCRIPTION OF THE INVENTION

Figure 1:
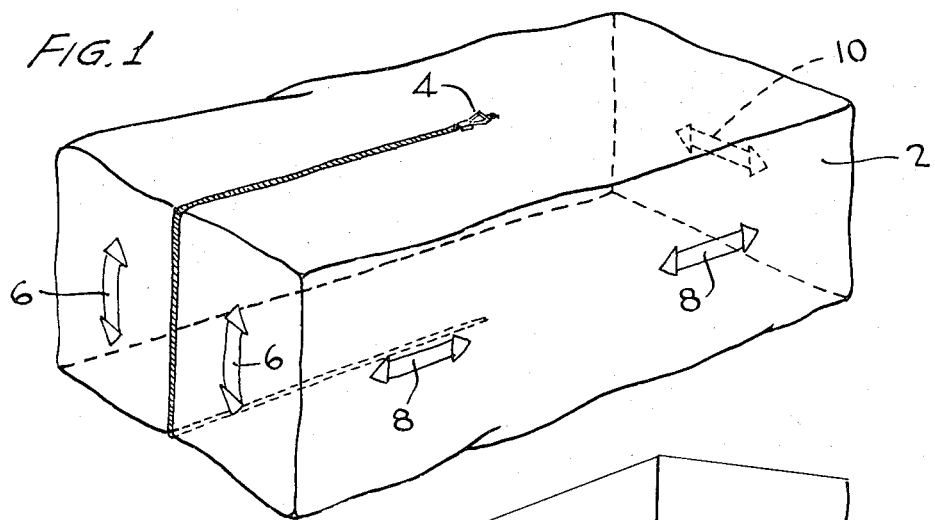
FIG. 1 is a perspective view of the Show-Tote Bale Bag.

In FIG. 1, we see in perspective view the Show-Tote Bale Bag as it would appear in place around a bale of hay. The bale bag will have a zipper 4 that starts at a point along the center line of a broad face of the bag approximately 18 inches from the closed end of the bale bag and which extends to the opposite end, across the top and down a similar distance on the opposite broad face of the bale bag. Attached to the bag are handles, generally located on the ends and the narrower opposed sides. These handles are provided for ease in movement of the bulky article.

Figure 2:
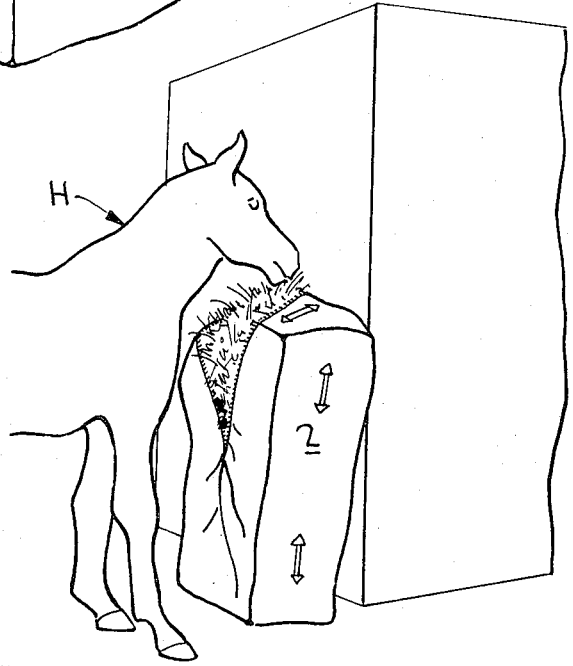
FIG. 2 is a perspective view of the Show-Tote Bale Bag in use as a feed container.

FIG. 2 shows one intended use of the bale bag. The zipper has been partially opened and the two portions of the bag have been spread apart to permit the animal to feed directly from the bale bag. This eliminates ground feeding and keeps the feed clean and relatively dirt free. Closed, of course, the bag protects the hay from dirt and scattering.

Figure 3:
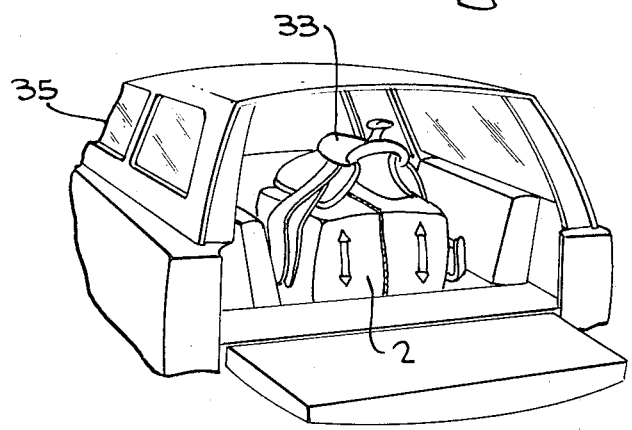
FIG. 3 is another perspective view of a second use of the Show-Tote Bale Bag.

FIG. 3 shows still another intended use of the bale bag. Here it is located in the back of a stationwagon employed as a saddle rack during the transportation of the animal and requisite tack to the site of the horseshow. This serves to conserve space, maintain the saddle in good condition and keep the saddle undersurface clean so it does not irritate the animal when placed on its back. When on occasion it is necessary to transport the bale of hay on the roof of the car because the vehicle is filled, the bale bag prevents scratching of the finish on the car and simultaneously keeps the hay or straw clean and dry.

In the preferred embodiment, the bale bag is form fitting to prevent unneccessary movement of the bale within the protective covering; consequently, the bag must be 42 inches long, 18 inches deep and 24 inches wide in order to accommodate the standard bale of hay available. The closure means can be anything conventionally available such as a zipper, which is the preferred embodiment. Alternatively, Velcro material, buttonsnaps or hooks and eyes may be used. The opening and zipper start at a point just below the midpoint of one of the wider faces of the bale and extend upward to one end across the top of the bale and down to below the midpoint and a similar position on the second broad face of the bag. Of course, the bag can be made from any weatherproof material such as vinyl sheets or polyester or nylon fabrics. However, the preferred material is a weatherproof canvas.

Thus it is seen that there are many advantages to the use of the bale bag. Primarily of course it permits the safe, clean transportation of a standard bale of hay in a passenger vehicle. Additionally, it prevents deterioration of the bale and subsequent sifting of the hay. It also serves as a protective covering both for the full bale initially and for any portion of the bale not consumed at the horseshow. It further serves as a feeding bag which prevents contamination of the animal's feed and eliminates ground feeding.

It is obvious that changes may be made without departing from the spirit of my invention, and I intend the following claims to cover such changes and modifications as naturally suggest themselves:

We claim:

1. A package comprising a substantially self-supporting bale of hay or straw; a form-fitting bag encasing said bale, said bag being made of a weatherproof material and having handle means on at least two opposed sides, and an opening that permits access to said body, said opening starting in one of the faces not having handle means, extending to an end of the bag, across said end and down the other face to a point opposite its initiation point, and closure means for effectively sealing the opening and securing the bale in the bag.

* * * * *